United States Patent Office 3,379,662
Patented Apr. 23, 1968

3,379,662
SEALING COMPOSITION COMPRISING BITUMEN RESIDUAL, ELASTOMER AND FILLER
Lloyd F. Bramble and Franklin C. Morrow, Houston, Tex., assignors to Gulf States Asphalt Co., Inc., a corporation of Texas
No Drawing. Continuation-in-part of application Ser. No. 233,928, Oct. 29, 1962. This application Oct. 26, 1964, Ser. No. 406,593
3 Claims. (Cl. 260—17.4)

This invention relates to new and useful improvements in compositions, and particularly adhesive and sealing bituminous compositions.

This is a continuation-in-part of our co-pending application Ser. No. 233,928, Oct. 29, 1962.

In our co-pending United States patent application Ser. No. 818,529, filed June 8, 1959, and issued as U.S. Patent No. 3,073,710, on Jan. 15, 1963, a bituminous composition is disclosed which has permanent, or substantially permanent, adhesive and sealing characteristics. Such material as disclosed therein has been a highly revolutionary product, particularly in the pipe joint sealing use. The present invention relates to a new and improved composition which has all of the advantages and novel features of the composition of said Patent No. 3,073,710, and in addition thereto, the composition hereof constitutes an improvement over the composition of said prior application.

An object of this invention is to provide a new and improved composition which is substantially permanently non-hardening and non-drying and which also has less temperature susceptibility than the composition of said Patent No. 3,073,710.

An important object of this invention is to provide a new and improved bituminous composition having petroleum derived bitumen residual and elastomer forming a base component, with or without some oil, which base component is combined with an additive such as asbestos, bentonite, or a mixture thereof.

Another object of this invention is to provide a new and improved bituminous composition which may be made in different colors by the addition of pigments or other color producing materials.

A further object of this invention is to provide a new and improved bituminous composition which is substantially permanently non-drying and non-hardening, and which is particularly suitable for use in damp places for forming seals by reason of a surfactant therewith.

A composition for carrying out the invention will be hereinafter described together with other features thereof.

The composition of this invention includes a petroleum derived bitumen residual which is the residual bitumen or product resulting from the distillation of petroleum. Such bitumen residual should have a Saybolt-Furol viscosity at 210° F. of from about 50 seconds to about 250 seconds when such bitumen residual is used without a quantity of oil therewith. When a bitumen residual of a harder constituency is employed in the composition of this invention, an oil is used therewith to plasticize or soften the residual to a condition comparable to the residual having the Saybolt-Furol viscosity at 210° F. of from about 50 seconds to about 250 seconds. It will be understood by those skilled in the art that the Saybolt-Furol viscosity is determined by the ASTM D88-44 procedure. It will also be understood that the term "ATSM" as used throughout this specification identifies the American Society for Testing Materials and the tests are those specified by such group.

The bitumen residual which is used in the composition of this invention should also have a low temperature susceptibility factor, preferably not greater than six and ordinarily from about two to about four. Also, the bitumen residual should be adhesive rather than unctuous and that can be determined readily by observation and contact.

The base component of the composition of this invention includes the bitumen residual, an elastomer, and ordinarily a quantity of oil. The following percentages by weight are preferred for each of such constituents in the base component: about ¼% to about 25% by weight of elastomer; 0% to about 25% by weight of oil; and about 50 to about 99¾ % by weight of bitumen residual.

Various types of vegetable, mineral and animal oils may be employed. For example, petroleum oils, fish oils, linseed oil, oiticia oil, tung oil, soybean oil, cottonseed oil and other oils may be used. Such oils may be of the blown type, raw or kettle bodied. Preferably the oil is present in an amount of from about 10% to 20% by weight, although the quantity of the oil will vary depending upon the hardness of the bitumen residual employed, as explained above.

The elastomer employed in this base component may be snythetic rubber, and natural rubber. It has been found that, quite unexpectedly, the inclusion of the elastomer in the base component produces a more pliable, more adhesive product with a decreased temperature susceptibility over the range of from 0° F. to 140° F. than such product without the elastomer. The quantities specified above for the constituents of the base component are such as to provide a final product, when mixed with suitable additives, as explained below, which has adhesiveness and pliabiliy at 0° F. and throughout the temperature range from 0° F. to 140° F. Also, the final product has substantially no flow at 140° F.

The pliability of the final product is tested at 0° C. in accordance with the test designated "SS–C–153" (paragraph E6) of the Federal Specifications, or any comparable test. Preferably, the pliability is tested at 0° C. by placing a ⅛ inch layer of the final product on a 28 gauge sheet metal and then bending same over a 1 inch mandrel taking a period of about 15 seconds for the bending. No cracking or separation occurs in the products of this invention under such test. The test for determining whether there is substantially no flow in the final product at 140° F. is preferably the ASTM test D 1191–52T.

The percentage range of the elastomer which is added to the base component depends upon the constituency of the residual and the oil, if the oil is employed. Small amounts of elastomer will produce the increased adhesiveness, and lessen the tendency of the product to flow at the higher temperatures while also providing a decreased temperature susceptibility, and normally the amount of elastomer will be at least about one-half percent by weight of the base component.

In addition to the base component, the composition of this invention also includes an additive or additives selected from a group consisting of finely ground inorganic silicates, vegetable fibers, mineral fibers, rice hulls, and mixtures thereof. Other materials may also be added, as will be explained hereinafter. The additives which are the finely ground materials and the fibrous materials may be any of a large variety, but by way of example, the finely ground material or materials may be bentonite, diatomaceous earth, colloidal clays, talc, slate flour and silicates, each of which should be fine enough to pass standard mesh screens from 100 to 400 in size. Fibrous materials such as asbestos, Wollastonite, magnesium silicates, ground vegetable or mineral fibers, cotton linters, rice hulls, jute, hemp, bagasse and other known organic or inorganic fibrous materials may be used.

Normally, the base component which includes the elastomer, the bitumen residual, and sometimes the oil, is present in the composition in a quantity of from about 45% to about 95% by weight. The finely ground material and/or fibrous material is normally the material composing most of the balance of the composition of this invention. However, other additives may be employed and they may be in substantial quantities, although they do not materially affect the characteristics of the product of this invention.

For example, it is desirable in some instances to incorporate surfactants which are materials known to decrease surface tension. Such surfactants include tallates, naphthanates, amines and other known chemicals. It has been found that such surfactants are preferably added in a quantity of about 1/8% to about 2% by weight for increasing the adhesiveness when the composition is used in excessively damp or wet circumstances. Thus, if the composition of this invention is to be used where the composition remains under water or in excessive dampness, it would be desirable to have a surfactant present in the composition.

In some uses, the composition of this invention may be given a more attractive appearance by the addition of coloring materials. These may be added in the form of pigments or coloring agents which are added as pastes, powders, or suspended in oil. For example, to make the composition of this invention a red or reddish color, iron oxide is added in an amount of about 4 pounds of the iron oxide to about a gallon of the composition. In that situation, the pigment would constitute about 35% of the composite material of the final product, although it will be understood that the pigment or coloring material itself actually does not change the characteristics of the material in use. Other colors may be provided with other known coloring agents such as chrome green to provide a green color, titanium dioxide or zinc oxide to provide a grayish or off-white color, and ferric chloride to provide a yellow or yellowish color. The amount of the coloring agents added will depend upon the shade of the color desired, but normally four pounds or less of the coloring agent to a gallon of the composition will provide a satisfactory shade of the color desired.

By way of more specific examples of the mode of preparation of the composition of this invention, the following are set forth (all percentages are by weight):

Example I

The base component was made by mixing together 96% bitumen residual (viscosity at 210° F.=about 70), 2% linseed oil, and 2% butadiene styrene. The bitumen residual was at about 300° F. when mixed with the other components. The final composition was made by mixing together 50% of such base component, 10% bagasse, and 40% aluminum silicates.

Example II

The base component was made by mixing together 98% bitumen residual (viscosity at 210° F.=about 150), and 2% butadiene styrene. The bitumen residual was at about 325° F. when mixed with the styrene and when the other components of the final composition were added thereto. The final composition was made by mixing together 50% of such base component, 10% asbestos, and 40% aluminum silicates.

Example III

The base component was made by mixing together 98% bitumen residual (viscosity at 210° F.=about 200) and 2% polybutene. The bitumen residual was at about 350° F. when mixed with the polybutene and when the other components of the final composition were added thereto. The final composition was made by mixing together 50% of such base component, 25% bentonite and 25% asbestos.

Example IV

The base component was made by mixing together 50% bitumen residual (viscosity at 210° F.=about 50), 25% linseed oil and 25% polybutene. The bitumen residual was at about 300° F. when mixed with the other components. The final composition was made by mixing together 50% of such base composition, 20% bagasse, and 30% aluminum silicates.

Example V

The base component was made by mixing together 75% bitumen residual (viscosity at 210° F.=about 70), 10% soybean oil, and 15% polybutene. The bitumen residual was at about 325° F. when mixed with the other components. The final composition was made by mixing together 50% of such base component, 20% asbestos and 30% aluminum silicates.

Example VI

The base component was made by mixing together 75% bitumen residual (viscosity at 210° F.=about 70), 15% cottonseed oil, and 10% butadiene styrene. The bitumen residual was at about 300° F. when mixed with the other components. The final composition was made by mixing together 80% of the base component, 10% bagasse, and 10% bentonite.

Although it is preferred to make the composition of this invention without any volatile solvent such as kerosene, naphtha, or diesel fuel, it has been found that the composition will remain substantially non-drying and non-hardening even though a volatile solvent is present in quantities up to about 10% by weight. The presence of the volatile solvent increases the shrinkage of the final product and also decreases the adhesiveness thereof, but the product may still be effective enough for some uses. It will be understood that materials other than those numerated might be added to the composition of this invention so long as the basic qualities of the composition are not altered enough to render it unsatisfactory from a commercial standpoint.

The composition of this invention is particularly suitable for sealing pipe joints, although it is also advantageous in other situations such as the sealing of concrete, ceramic, and steel, particularly where the material is exposed to dampness and some shifting of the components which are sealed. The substantially permanent pliability and the low temperature susceptibility of the composition of this invention provides many endless applications and a very unusual product.

What is claimed is:

1. A composition having substantially permanent sealing and adhesive properties, comprising:
    (a) from about 45% to about 95% of a base component,
    (b) said base component including:
        (1) from about 50% to about 99¾% of bitumen residual,
        (2) from about ¼% to about 25% of an elastomer selected from the group consisting of butadiene styrene and polybutene, and
        (3) from 0% to about 25% of oil, and
    (c) with essentially all of the remainder an additive selected from the group consisting of finely ground inorganic silicates, vegetable fibers, mineral fibers, rice hulls and mixtures thereof.

2. The composition set forth in claim 1, including about 1/8% to about 2% of surfactant.

3. The composition set forth in claim 1, including a color-producing material for changing the color of the final product.

References Cited

UNITED STATES PATENTS

| | | | |
|---|---|---|---|
| 2,470,141 | 5/1949 | Caves | 260—758 |
| 2,700,655 | 1/1955 | Endres | 260—758 |
| 2,728,734 | 12/1955 | Cubberly | 260—758 |
| 3,073,710 | 1/1963 | Morrow et al. | 260—163 |

WILLIAM H. SHORT, *Primary Examiner.*

J. NORRIS, *Assistant Examiner.*